United States Patent

[11] 3,551,691

[72] Inventors Katsutoshi Nishimura;
  Kiyoji Fujisawa; Isao Kozu; Kozo Yamamoto, Osaka, Japan
[21] Appl. No. 771,905
[22] Filed Oct. 30, 1968
[45] Patented Dec. 29, 1970
[73] Assignee Matsushita Electric Industrial Co., Ltd.
  Osaka, Japan
[32] Priority Nov. 2, 1967
[33] Japan
[31] No. 42/71049

[54] DEVICE FOR DETECTING ROTATION
  13 Claims, 12 Drawing Figs.
[52] U.S. Cl. .................................................. 307/120,
  340/271; 317/5
[51] Int. Cl. ....................................................... H01h 35/02
[50] Field of Search ........................................... 307/116,
  119, 122, 120; 340/271X; 200/61.17; 317/5X;
  324/70CG

[56] References Cited
UNITED STATES PATENTS

| | | | |
|---|---|---|---|
| 2,927,474 | 3/1960 | Peras............................ | 317/5X |
| 2,929,023 | 3/1960 | Mischon et al. .............. | 340/271UX |
| 3,062,988 | 11/1962 | Fitch et al..................... | 340/271UX |
| 3,120,655 | 2/1964 | Beason et al.................. | 340/271 |
| 3,276,256 | 10/1966 | Rudasill et al. ............... | 340/271X |

Primary Examiner—Robert K. Schaefer
Assistant Examiner—T. B. Joike
Attorney—Wenderoth, Link & Ponack ABSTRACT: A rotation detecting device. A mechanical switch is provided which operates as a single-pole double throw switch. An electric circuit is responsive to the action of the mechanical switch. The mechanical switch comprises a rotating body which has at least one conductive segment on the surface thereof and contacts for electrically connecting the rotating body with the electric circuit. The electric circuit includes capacitors, the electric charge of which is controlled by the rotation of the rotating body.

DEVICE FOR DETECTING ROTATION

This invention relates to a rotation detecting device capable of controlling other devices and which operates in accordance with the rotation of a rotating body. More particularly, it relates to a rotation detecting device comprising a mechanical switch which cooperates with a rotating body without imposing any mechanical load thereon, and a controlling means which is responsive to the mechanical switch.

A conventional rotation detecting device comprises a switch having three contact segments, the middle one of which is an armature and is longer than the other two. An eccentric cam rigidly secured to a rotating shaft hits the longest contact segment of the conventional switch during rotation of said shaft. Upon being hit by said eccentric cam, the switch is placed in an opened circuit or in a closed circuit position. Such a switch imposes an undesired mechanical load on the shaft. It is desirable that the mechanical load be as low as possible. The undesirable mechanical load can be lowered by using a switch which is operated by an extremely low force. However, such a switch is not easy to manufacture and is expensive in addition to having inferior durability.

Therefore, one object of the present invention is to provide a rotation detecting device which is capable of controlling another device which is to be operated in accordance with the rotation of a rotating body without imposing any mechanical load on the rotating body.

Another object of the present invention is to provide a rotation detecting device capable of measuring the speed of rotation of a rotating body without imposing any mechanical load on the rotating body.

A further object of the present invention is to provide a rotation detecting device including a mechanical switch which comprises a rotating shaft which can be a reel spindle of a tape recorder.

The rotation detecting device according to the present invention comprises a mechanical switch and a controlling means responsive to said mechanical switch. Said mechanical switch comprises a rotating body which is made up of a shaft and a rotor having at least one conductive segment on the surface thereof and electric contacts coupled electrically with said rotating body. The conductive segments on the rotating body and said electric contacts are arranged to act as a single-pole double throw switch.

The invention will be more fully described in the following specification taken together with the accompanying drawings, wherein.

Figure 1:
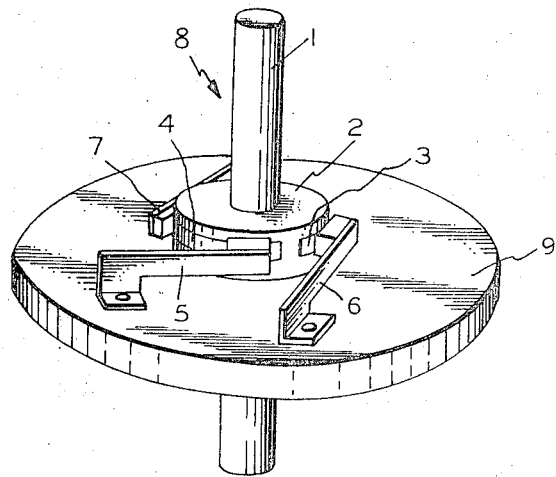
FIG. 1 is a perspective view of a mechanical switch according to the present invention.
Figure 9:
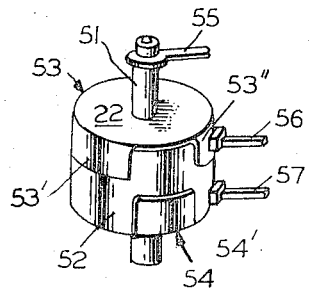
Figure 10:
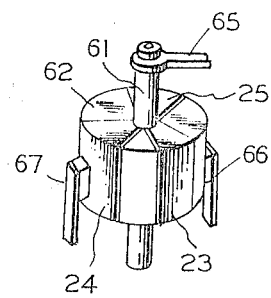
Figure 11:
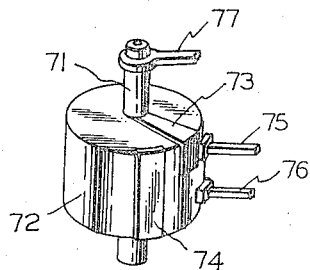
Figure 12:
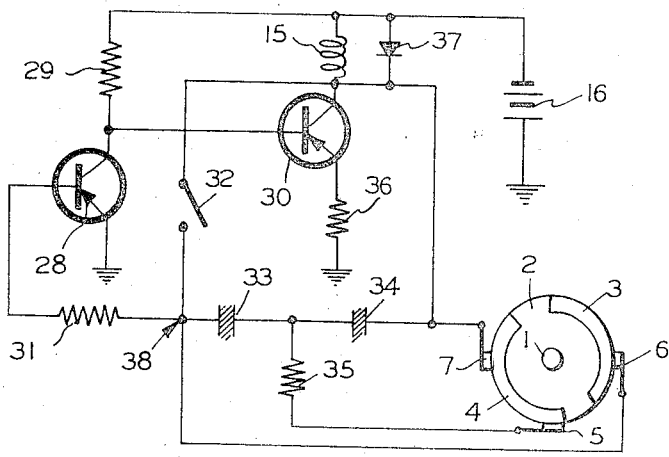

FIGS. 9—11 are perspective views of other embodiments of the mechanical switch according to the present invention; and FIG. 12 is a circuit diagram of a rotation detecting device having as part thereof the mechanical switch of FIG. 1, and being combined with another controlling circuit.

FIG. 1 shows an embodiment of a mechanical switch contemplated by the present invention. In FIG. 1, a rotating body 8 is comprised of a shaft 1 and a rotor 2 rigidly secured to said shaft 1. The rotating body 8 is rotatably supported on a frame 9. Said rotor 2 is made of a nonconductive material such as organic resin or ceramic material and has two conductive segments 3 and 4 set into the peripheral surface thereof. Three electric contacts 5, 6 and 7 have their one ends fixed to said frame 9 and the other ends are in contact with the periphery of said rotor 2 so as to contact said conductive segments 3 and 4 intermittently, in accordance with the rotation of said rotor 2.

Said electrical contacts are designated the first electric contact 5, the second electric contact 6 and the third electric contact 7, and are preferably electrical brushes having a resilient arm which ensures a good electrical contact with said conductive segment 3 or 4. Said conductive segments 3 and 4 are set into the surface of said rotor 2 so as to form a substantially smooth surface therewith.

Figure 2:
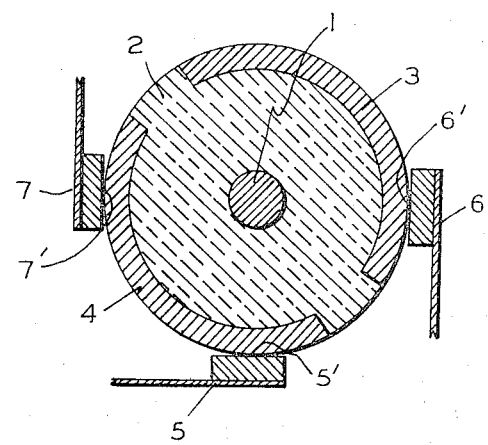
FIG. 2 is a cross-sectional view of the mechanical switch according to the invention.
Figure 3:
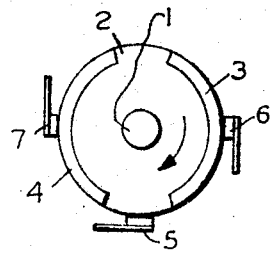
FIGS. 3 to 6 are schematic plan views of the switch in different operating positions.
Figure 4:
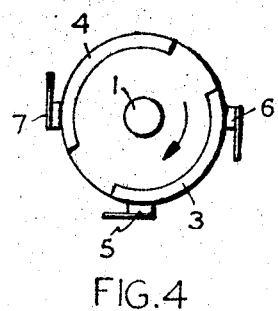
Figure 5:
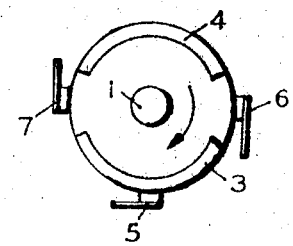
Figure 6:
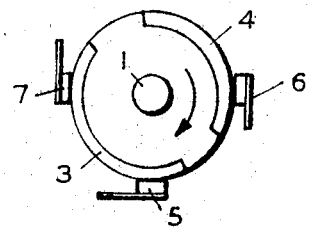

In the position of the device as shown in FIG. 2, said rotating body 8 is in contact with the first, second and third electric contacts 5, 6 and 7 at contacting points 5', 6' and 7', respectively. Said first electric contact 5 is electrically connected, through said segment 4, with said third electric contact 7, while said second contact 6 is electrically isolated from said first and third electric contacts 5 and 7. At the position shown in FIG. 3, contact 5 is electrically isolated from both contacts 6 and 7. At the position as shown in FIG. 4, the first contact 5 is electrically connected, through said segment 3, with said second contact 6 while said third contact 7 is electrically isolated from said first and second electric contacts 5 and 6. It is important that said first electric contact 5 can be electrically connected, through one of said segments 3 and 4, with either one of said second and third electric contacts 6 and 7, but that said third electric contact 7 is never electrically connected with said second electric contact 6 during the rotation of said rotating body 8.

This can be accomplished by making the length of the arc between contacting points 5' and 6' substantially equal to that between contacting points 5' and 7' and shorter than the arc length of segments 3 and 4, and by making the arc length of segments 3 and 4 substantially equal to each other and the arc length between contacting points 6' and 7' longer than that of segments 3 or 4.

With such an arrangement of electric contacts 5, 6 and 7, and segments 3 and 4, the electrical connections between said first electric contact 5 and said second electric contact 6 and between said first electric contact 5 and said third electric contact 7 are alternatively in a closed circuit and an open circuit during the rotation of said rotating body 8. Therefore, the mechanical switch according to the present invention acts as a single-pole double throw switch. During the rotation of the rotating body 8, the relationship of said contacting points and conductive segments are changed in turn, as shown in FIGS. 2—6.

Figure 7:
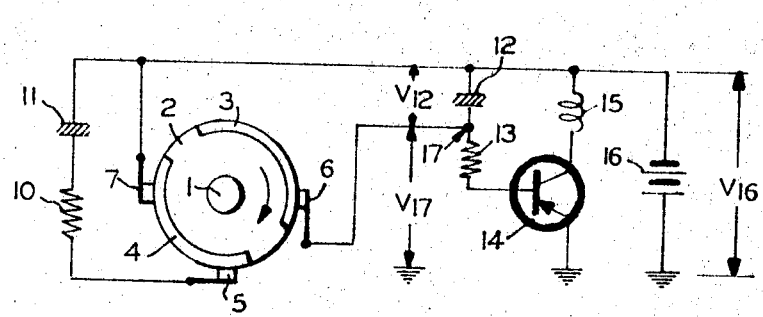
FIG. 7 is a circuit diagram of a rotation detecting device combined with a mechanical switch and controlling circuit in accordance with the present invention.

In the circuit of FIG. 7, said first electric contact 5 is connected to a power supply 16 through a resistor 10 and a capacitor 11. Said second electric contact 6 is connected to a junction point 17 of two electrical circuits, one of which extends to said power supply 16 through a capacitor 12, and the other of which extends to the base of a transistor 14 through a resistor 13. Said third electric contact 7 is directly connected to said power supply 16. Said transistor 14 has a grounded emitter and has the collector connected to said power supply 16 through a solenoid coil 15.

When said mechanical switch is in the switching position as shown in FIG. 7, the first electric contact 5 is connected to the third electric contact 7 through the conductive segment 4. In this circuit condition, the voltage across the capacitor 11 is equal to zero because the capacitor 11 is short-circuited by the resistor 10 which protects the electric contacts 5 and 7 and the conductive segments 3 and 4 from accidental damage due to an extremely high discharge current from the capacitor 11. On the other hand, the voltage $V_{12}$ across the capacitor 12 is substantially equal to that of the power supply 16 because the capacitor 12 is charged up to the voltage of power supply 16. The voltage $V_{17}$ across the junction point 17 and ground becomes substantially equal to zero. Accordingly, the transistor 14 is in a nonconductive state because there is no current flowing into the base of transistor 14.

When the mechanical switch is rotated to the switching position as shown in FIG. 4, the first electric contact 5 is connected to the second electric contact 6 through the conductive segment 3 and the capacitor 11 is connected in parallel with the capacitor 12.

The voltage $V_{12}$ across the capacitor 12 now drops abruptly to approximately $V_{16} \cdot C_{12}/(C_{11}+C_{12})$ because the electric charge which was previously stored in the capacitor 12 is delivered to the capacitor 11.

As a result, the voltage $V_{17}$ at the point 17 rises abruptly from 0 to approximately $V_{16}/C_{11} 1(C_{11}+C_{12})$, and a current of about $V_{17}/R_{13}$ begins to flow into the base of transistor 14, and the transistor 14 becomes conductive. This allows a large current, i.e. sufficient to saturate the coil 15, to flow from the power supply 16 to the collector of transistor 14, the coil 15 is energized by said large collector current, and a plunger which is used as an output device of the rotation detecting device is actuated.

Thereafter, the voltage $V_{17}$ will fall exponentially toward zero with a time constant $\tau=(C_{11}+C_{12}) \cdot R_{13}$ and the current $V_{17}/R_{13}$ will also decrease. As a result, the current $V_{17}R_{13}$ becomes zero and the transistor 14 again becomes nonconductive.

As is well known, the voltage across a capacitor in a circuit composed of a resistor and a capacitor is expressed as a function of time. In order to ensure that said transistor 14 is conductive even when said shaft 1 rotates slowly, it is necessary that the product CR of the resistor and capacitor, i.e. the time constant, be as large as possible. In order to shorten the time cycle of a mechanical switch having an invariable time constant, it is necessary to increase the rotating speed of said shaft 1 or to increase the number of conductive segments.

When the shaft 1 stops, the transistor 14 is nonconductive regardless of the position of said rotor 2. Since the capacitor 12 is charged up to a voltage $V_{16}$ over a relatively long time, with the switch in the position of FIGS. 7, 3, 5 and 6, no base current flows and the transistor 14 becomes nonconductive. In the position of FIG. 4, the parallel connection of the capacitor 11 and the capacitor 12 causes the charging time of capacitors to be prolonged. Accordingly, the time necessary for transistor 14 to be converted from the conductive state to the nonconductive state is longer than the charging time of the capacitor 12.

Since the solenoid coil 15 is energized by the collector current of transistor 12, the movement of the plunger gives an indication of whether the shaft 1 is rotating or stopped. The plunger can be coupled with another device which operates in accordance with the rotation of a shaft 1.

It is preferable that said second electric contact 6 and third electric contact 7 be disposed to contact the surface of said rotor 2 at opposite ends of a diameter of said rotor 2. It is also desirable for easy manufacturing that said two segments are opposed to each other and substantially the same length. However, the mechanical switch according to the present invention is not limited to the construction as described in the foregoing description. For example, a mechanical switch including only one conductive segment can also act as a mechanical switch, and a mechanical switch having more than three conductive segments can also act as a satisfactory mechanical switch.

Figure 8:
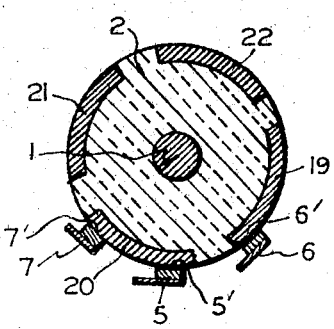
FIG. 8 is a cross-sectional view of another embodiment of a mechanical switch according to the invention.

Referring to FIG. 8, wherein the same references designate elements the same as those of FIGS. 1 and 2, four conductive segments 18, 19, 20 and 21, having the same length, are positioned symmetrically on the periphery of rotor 2. Three electric contacts 5, 6 and 7 make contact with the surface of said rotor 2 at the one side of the periphery of said rotor 2. The arc length between conducting points 5' and 6' or 5' and 7' is less than the length of said conductive segments. Such an arrangement makes it possible to shorten the cycling time for switching action, and has an effect similar to the effect of increasing the speed of rotation of the shaft 1.

It is not necessary to use three electrical contacts in the form of resilient electric brushes. Referring to FIG. 9, a first electric contact 55 is rotatably connected to a shaft 51 which is made of an electrically conductive material. A second electric contact 56 and third electric contact 57 are in contact with the side surface of a rotor 52 in such a way that said second contact 56 contacts the upper portion of the periphery of the rotor and said third contact 57 contacts the lower portion thereof. An upper conductive segment 53 has a portion 22 which covers the upper flat surface of said rotor 52 and has projections 53' and 53'' extending down over the upper portion of the peripheral surface of said rotor 52. A third projection is not shown in FIG. 9. A lower conductive segment 54 has a portion which covers the lower flat surface of said rotor 52 and has three projections, only projection 54' being visible, extending up over the lower portion of the peripheral surface of rotor 52, and which are out of alignment with the projections on the upper conductive segment 53. Both the upper conductive segment 53 and lower conductive segment 54 are electrically connected with the shaft 51. Such an arrangement makes it possible to connect electrically said first electric contact 55 with said second electric contact 56 or said third electric contact 57 in accordance with the rotation of said shaft 51. There is no possibility of completing a circuit between said second electric contact 6 and said third electric contact 57. Therefore, such an arrangement of conductive segments and electrical contacts is similar to that of FIG. 1.

Another embodiment of the switch is shown in FIG. 10. A first electric contact 65 is rotatably connected to a shaft 61 made of an electrically conductive material. A second electric contact 66 and a third electric contact 67 are positioned on opposite sides of a rotor 62 to contact the peripheral surface of said rotor 62. Three conductive segments 23, 24 and 25 cover the surface of said rotor 62, extending from the upper face across the peripheral surface to the lower face. The end of each of the three segments 23, 24, and 25 is in contact with said shaft 61. It is important that said second and third electric contacts 66 and 67 and said three conductive segments 23, 24 and 25 be arranged in such a way that both the electric contacts 66 and 67 are not in contact with said conductive segments at the same time. When one electric contact, for example, the second electric contact 66, is in contact with one of the three segments, the third electric contact 67 is not in contact with any of the three segments. By using such a construction, it is possible to complete a circuit between the first electric contact 65 and second electric contact 66 or third electric contact 67, in accordance with the rotation of said rotor 12.

FIG. 11 shows still another embodiment of the switch. A third electric contact 77 is rotatably connected to a shaft 71 made of a conductive material. A first electric contact 75 and a second electric contact 76 are in contact with the upper and lower portions, respectively, or the peripheral surface of a rotor 71. An upper conductive segment 73 in the form of a strip is connected with said shaft 71 and extends across the top and down the upper portion of the peripheral surface of said rotor 72 to the middle thereof. A lower conductive segment 74 in the form of a strip extends across the whole of the peripheral surface of said rotor 72. Said upper segment 73 does not contact said second electric contact 76. Both electric segments 73 and 74 are on the peripheral surface of said rotor 72 are separated from each other a distance greater than the peripheral length of the contacting area of said electric contacts 75 and 76. Such an arrangement makes it possible to complete a circuit between the first electric contact 75 and the third electric contact 77, while the second contact 76 is electrically isolated from both electric contacts 75 and 77. When said lower segment 74 is in contact with said first electric contact 75 and second electric contact 76 at the same time, the third contact 77 is electrically isolated from both electric contacts 75 and 76.

FIG. 12 shows the circuit for a detecting device combined with another circuit, and similar reference numbers designate components similar to those of FIG. 7. The first electric contact 5 is connected to the base of a first transistor 28 through a resistor 35, a capacitor 33 and a resistor 31. The third electric contact 7 is connected directly to the collector of a second transistor 30. Said capacitor 33 is connected to the collector of said second transistor 30 through a second capacitor 34. The second electric contact 6 is connected to a junction point 38 between said resistor 31 and said first capacitor 33. The collector of said first transistor 28 is connected to the base of said second transistor 30.

The collector of said first transistor 28 is connected to a power supply 16 through a resistor 29. The emitter of said first transistor 28 is grounded. The collector of the second transistor 30 is connected to said power supply 16 through the solenoid coil 15. The emitter of said second transistor 30 is grounded through a resistor 36. Said junction point 38 is connected to the collector of the second transistor 30 through a switch 32.

When said switch 32 is open, said capacitor 33 and said capacitor 34 are short-circuited alternately through a resistor 35 by the mechanical switch during rotation of said mechanical switch. Such alternative short circuiting is equivalent to the use of a battery having a voltage of about zero for both the capacitors 33 and 34. Therefore, the base current of first transistor 28 is supplied through the resistor 31 from the collector of the second transistor 30 and said first transistor 28 becomes conductive, and said second transistor 30 becomes nonconductive. If said rotor stops, said first transistor 28 has no current flowing through the base, and is nonconductive due to completion of charging of said capacitor 33 or capacitor 34. At the same time, said second transistor 30 becomes conductive and has a collector current which energizes said solenoid coil 15. When said switch 32 is closed, said first transistor has a base current flowing from the resistor 31 to said switch 32, said first transistor 28 is conductive and said second transistor 30 is nonconductive, regardless of rotation of the mechanical switch.

In the foregoing description, reference 15 designates only a solenoid coil for actuation of a plunger, but is not restricted to a solenoid coil for a plunger. In place of the solenoid coil, for example, a coil of a relay, can be used. By using such a relay, coupled with the rotation detecting device according to the present invention, other devices can be controlled. In addition, a lamp or indicating meter can be employed in place of the plunger solenoid coil to indicate the rotation of the shaft.

In addition to indicating rotation or nonrotation, the rotation detecting device according to the present invention can be used for measurement of rotational speed, because the voltage $V_{17}$ increases with a decrease in the time of the switching cycle of said mechanical switch and controls the base current of said transistor 14 while said rotation speed governs the time of said switching cycle. Therefore, it will be readily understood that a rotation detecting device according to the present invention can be used to control the tension of the tape of a tape recorder.

We claim:

1. A rotation detecting device comprising a mechanical switch and a controlling means;

said mechanical switch comprising;

a rotating body including a shaft and a rotor on said shaft, said rotor having at least one conductive segment on the surface thereof; and means for electrically connecting said rotating body with said controlling means including first, second and third contacts positioned to contact the surface of said rotor, the contact point of said first contact being spaced equidistantly from the contact points of said second and third contacts, and the contact points of said second and third contacts being spaced a distance greater than said equidistant spacing, said conductive segment being only slightly longer than the said equidistant spacing so that said first contact is electrically connected with said second or third contact through said conductive segment during the rotation of said rotating body, while said second contact is never electrically connected with said third contact through said conductive segment, whereby said mechanical switch operates as a single-pole double-throw switch; and said controlling means comprising; a resistor, first and second capacitors, a power supply one end of which is grounded, a transistor the emitter of which is grounded, and an actuating coil for a device such as a plunger or a relay which serves as an indicator for said rotation detecting device, said resistor and first capacitor being connected in series, the base of said transistor being connected to the other end of said power supply through the series connected resistor and first capacitor, the collector of said transistor being connected to said other end of said power supply through said actuating coil, said second capacitor being connected between said other end of power supply and said first contact, said second contact being connected to the junction point of said first capacitor and said resistor, and said third contact being connected to said other end of said power supply, whereby said mechanical switch is connected to said capacitors so that during the rotation of said rotating body said second capacitor is alternately connected in parallel with said first capacitor and in a short circuit which forms a discharge path for said second capacitor.

2. A rotation detecting device as claimed in claim 1 wherein said second and third contacts are diametrically disposed with respect to said rotor.

3. A rotation detecting device as claimed in claim 1 wherein said rotor has at least two conductive segments which are spaced equidistantly from each other.

4. A rotation detecting device as claimed in claim 1 wherein the value of the resistance and capacitance of said resistor and said capacitors have magnitudes such that sufficient current for energizing said actuating coil flows into the collector of said transistor when the speed of rotation of said rotating body exceeds a predetermined speed.

5. A rotation detecting device as claimed in claim 1 wherein the resistance and capacitance of said resistor and said capacitors are such that the collector current of said transistor is continuously controlled according to the speed of rotation of said rotating body.

6. A rotation detecting device as claimed in claim 1 further comprising a current restricting resistor having a low resistance value connected between second capacitor and said first contact so as to prevent the damage to said contacts and said conductive segment of mechanical switch due to a surge of current into said second capacitor during the rotation of said rotating body.

7. A rotation detecting device comprising a mechanical switch and a controlling means:

said mechanical switching comprising;

a rotating body including a shaft and a rotor on said shaft, said rotor having at least one conductive segment on the surface thereof; and means for electrically connecting said rotating body with said controlling means including first, second and third contacts positioned to contact the surface of said rotor, the contact point of said first contact being spaced equidistantly from the contact points of said second and third contacts, and the contact points of said second and third contacts, being spaced a distance greater than said equidistant spacing, said conductive segment being only slightly longer than the said equidistant spacing so that said first contact is electrically connected with said second or third contact through said conductive segment during the rotation of said rotating body, while said second contact is never electrically connected with said third contact through said conductive segment, whereby said mechanical switch operates as a single-pole double-throw switch; and said controlling means comprising; first, second and third resistors, first and second capacitors, a power supply one end of which is grounded, a first transistor the emitter of which is directly grounded, a second transistor the emitter of which is grounded through said first resistor, and an actuating coil for a device such as a plunger or a relay which serves as an indicator for said rotation detecting device, said second resistor and said first and second capacitors being connected in series, the base of said first transistor being connected to the collector of said second transistor through said series connected second resistor and first and second capacitors, the collector of said first transistor being connected directly to the base of said second transistor and through said third resistor to the other end of said power supply, the collector of said second transistor being connected to said other end of power supply through said actuating coil, said first contact being connected to the junction point of said first and second capacitors, said second contact being connected to the junction point of said second resistor and said first capacitor, said third contact being connected to the junction point of the collector of said second transistor and said second capacitor, whereby said mechanical switch alternately connects the opposite ends of said series connected capacitors to the junction of said capacitors during the rotation of said rotating body.

8. A rotation detecting device as claimed in claim 7 wherein said second and third contacts are diametrically disposed with respect to said rotor.

9. A rotation detecting device as claimed in claim 8 wherein said rotor has at least two conductive segments which are spaced equidistantly from each other.

10. A rotation detecting device as claimed in claim 8 wherein the value of the resistance and capacitance of said second resistor and said capacitors have magnitudes such that sufficient current for energizing said actuating coil flows into the collector of said second transistor when the speed of rotation of said rotating body exceeds a predetermined speed.

11. A rotation detecting device as claimed in claim 8 wherein the values of the resistance and capacitance of said second resistor and said capacitors are such that the collector current of said second transistor is continuously controlled according to the speed of rotation of said rotating body.

12. A rotation detecting device as claimed in claim 8, further comprising a current restricting resistor having a low resistance value connected between said junction point of said capacitors and said first contact so as to prevent the damage to said contacts and said conductive segment of said mechanical switch due to the discharge current of said capacitors during the rotation of said rotating body.

13. A rotation detecting device as claimed in claim 8 wherein said controlling means further includes a switch which is connected across said series connected capacitors so as to enable said controlling circuit to be maintained in a given state independent of the state of said mechanical switch.